July 15, 1958  E. C. PLOETZ  2,842,840
METHOD OF FABRICATING GLASS COATED METALLIC ARTICLES
Filed Feb. 11, 1954

INVENTOR.
EDWIN  C.  PLOETZ
BY  Andrus & Sceales
ATTORNEYS

United States Patent Office 2,842,840
Patented July 15, 1958

2,842,840

METHOD OF FABRICATING GLASS COATED METALLIC ARTICLES

Edwin C. Ploetz, Kankakee, Ill., assignor to A. O. Smith Corporation, Milwaukee, Wis., a corporation of New York Application February 11, 1954, Serial No. 409,640

3 Claims. (Cl. 29—458)

This invention relates generally to a method of fabricating glass coated articles wherein the parts are welded together and more particularly to welded tanks having an interior coating of glass or vitreous enamel.

In the making of glass coated tanks for the storage of hot water, in general, the usual procedure after cleaning of the heads and shell is to coat the inside of the shell and each head with a glass slip followed by drying, and then fusing of the glass coating material to the metal at temperatures approximating 1600° F. to provide a hardened glass coating throughout the inside of these parts. Either one or two coats of the glass slip are applied and dried and fused in this manner. Thereafter the heads and shell are welded together.

The welding of the heads and shell after fusing of the enamel produces a tank wherein the members and fused coating may be placed in a stressed condition, and does not take advantage of the stress relieving of the parts that are welded together which the high temperature glass fusing operation would naturally give.

The present invention is directed to a method of glass coating a welded metallic article, such as a water heater tank, wherein the glass coating is fused to the parts after they are welded together. The method of the invention stress relieves the tank after welding and decreases handling expenses as well as increasing the production rate through the firing furnaces.

Briefly, the invention comprises forming the tank shell and heads from a sheet steel and cleansing the same as by blasting with an abrasive. The interior surfaces of the shell and heads are then sprayed with a glass lining material and dried. The dried glass before firing is commonly referred to as a bisque and contains or has applied thereto a material that increases its elasticity. The extreme ends of the shell and head are brushed free of the dried bisque to prepare the edges for welding. The parts are assembled and completely welded together to form the water heater tank. Finally the welded tanks are loaded into a furnace and fired at temperatures of approximately 1600° F. The glass coating fuses to the steel and flows into and seals all welded joints. The fusing temperatures relieve the stresses that may have developed in the parts due to the welding operations.

Other objects of this invention will become apparent from the description that follows, taken in conjunction with the accompanying drawing, in which.

Figure 1:
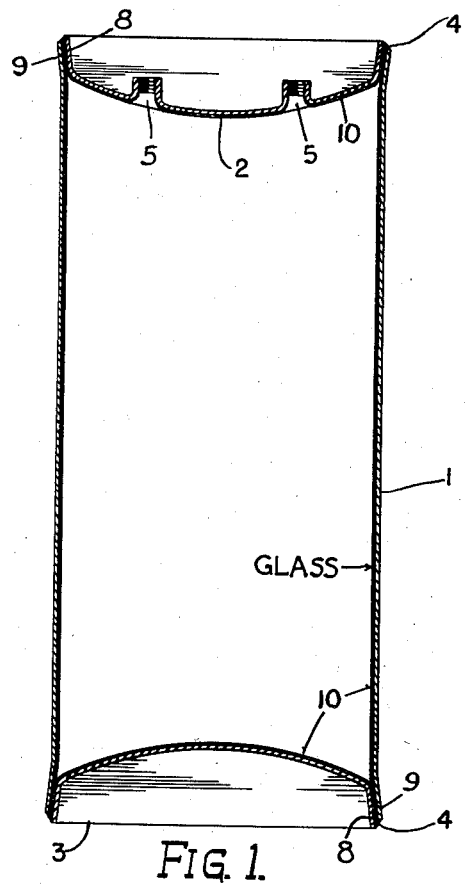
Figure 1 is a longitudinal sectional view of the completed tank.

In the drawing is shown a tank for an electric water heater to which the process of this invention has been applied.

The tank is formed of a generally cylindrical shell 1 having a flanged and dished upper head 2 and lower head 3 secured within the ends of the shell 1 by welds 4. Openings 5 are suitably provided in the head 2 to receive fittings appropriate to the service for which the tank is intended.

In the fabrication of the tank, shell 1 is formed of sheet steel which is welded into cylindrical section. Provision is made in the shell for appropriate fittings, not shown. The circular dished heads 2 and 3 closely approximate the inside diameter of the cylindrical shell 1 and are preferably formed of a metal similar to that of the shell.

Shell 1 and heads 2 and 3 are next thoroughly cleaned such as by application of a hot alkali solution and then by pressure blasting with a suitable abrasive material.

Figure 2:
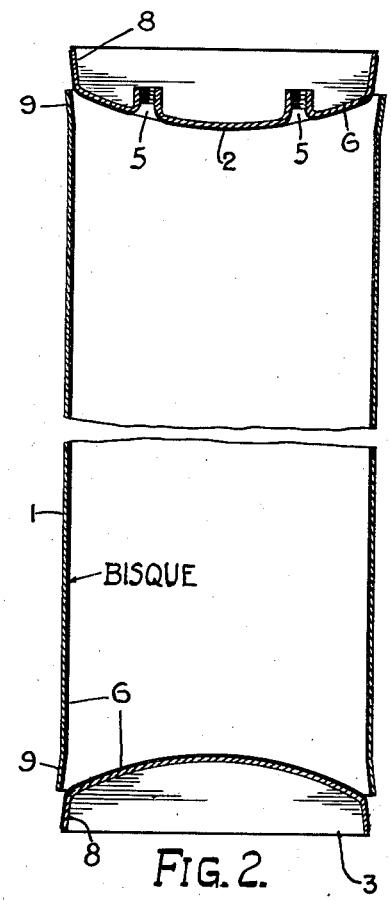
Fig. 2 shows an exploded view in section of the elements of a tank preparatory to assembly for welding and after the interior surfaces have been coated with a glass lining material which has been dried.

After thorough cleansing, the individual tank members are ready to receive the glass or vitreous enamel composition on the surfaces which will form the interior of the tank. The glass composition is mixed with water to form a slurry which is slushed or sprayed onto the individual tank surfaces. After the surfaces are coated, the glass lining material, which may be referred to then as slip, is dried to remove the water from the material. To speed drying, the shell and heads may be subjected to heat in a convection oven at temperatures of 200° F. to 300° F. to dry the applied slip into the bisque 6 that coats the entire surfaces of the heads and shell as shown in Fig. 2.

The dried glass bisque which is located on the outer edges of shell 1 and heads 2 and 3 is brushed off as at 7 to prepare the edges for welding. The parts are then inspected to make certain they are properly coated with the dried bisque 6.

Figure 3:
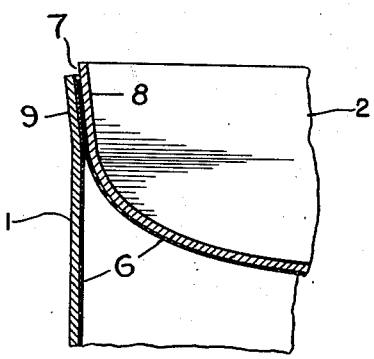
Fig. 3 is an enlarged fragmentary section of the shell and head after assembly for welding has been completed.

Heads 2 and 3 are next inserted within the flared ends of shell 1, substantially as shown in Fig. 3, with the annular flanges 8 of the heads being substantially contiguous with the flanged ends 9 of the shell, and are tack welded into place. The tacked members are then completely welded together, such as by submerged arc welding, as indicated by the welds 4.

After being fully welded, the welded tank, coated interiorly with the dried glass bisque 6, is loaded onto a furnace tray and preferably fired in a controlled oxidation process. During firing the bisque 6 fuses to the steel and flows into and seals all the welded joints. Thus the firing of bisque 6 provides a hard glass coating 10 which extends continuously over the interior surfaces of the tank as shown in Figure 1. After firing the completed tank is tested to assure its proper operation in service.

Occasionally the top and bottom heads are out of round with the shell. A good fit between the members is essential to assure a good weld. To attain a good fit between the members some deformation or flexing of the members may be necessary. Such deformation, however, may be detrimental to the dried glass bisque coating, resulting in the bisque cracking or crawling particularly at the adjoining surfaces of the heads and shell. To overcome this phenomena it may be desirable to increase the elasticity of the dried bisque. This may be accomplished by adding various binders such as sodium aluminate to the original slurry which is applied to the cleaned members to provide the bisque coating. Experiments have also shown that coating the dried bisque with a paraffin solution has also increased the elasticity of the bisque. The paraffin may be dissolved in a solvent and sprayed or brushed on the dried bisque, thoroughly wetting the surfaces which may be affected by the cracking and crawling phenomena. By increasing the elasticity of the dried bisque as described, the members may safely be deformed to assure a good fit therebetween for welding.

A tank constructed according to the method herein described is entirely glass coated on its interior, including the welded assembly joints which are sealed by the glass. As a result the tank is more resistant to corrosion by action of the materials stored therein.

Where the individual parts are fired prior to assembly and welding to fuse the glass to the steel, assembly is frequently difficult since the firing operation may effect warping of the parts which will adversely affect the fit of the parts. In order to obtain a good fit between the previously fired members prior to welding it may be necessary to reheat the metal to its yield point. Upsetting the metal in this manner to obtain a good fit frequently causes the fused glass lining to crack. Assembly and welding before firing of the tank, as disclosed in the present invention, eliminates the fitting problem.

Also by the process disclosed herein, the firing not only fuses the glass to the members and causes the glass to flow into and seal the welded joints, but relieves the tank of any stresses that may have been induced therein during the prior welding operations.

This invention will also materially reduce the production costs in the fabrication of tanks. Handling costs are reduced because assembly and welding of the members are completed at an earlier stage in the production cycle. Furnace tooling costs are lessened since the furnace need only be equipped to handle the assembled tank and not the separate parts. Furnace capacity is also greatly increased in that the tray loading of the furnace for firing is limited only by the tank dimensions. Thus, the process herein described for fabricating glass-lined tanks not only turns out a better product, but also lessens production difficulties and production costs.

Although the invention has been described with respect to a tank for an electric water heater it is also applicable to gas water heaters having central or outside flues and may be employed on any metallic article where the parts are welded together to form the article.

Various modes of carrying out the invention are contemplated as within the scope of the following claims particularly pointing out and distinctly claiming the subject matter which is regarded as the invention.

I claim:

1. In a method of fabricating a glass-lined tank structure from preformed steel members, the steps of applying a wet coating of a glass composition to the interior surfaces of the preformed members, drying said coating to substantially remove the water therefrom to form a dried glass bisque, applying a coating of a paraffin compound to the dried glass bisque adjacent the ends of the members to be joined together to increase the bisque elasticity adjacent said ends of the members to permit deforming of the members during assembly to obtain a good fit therebetween and prevent cracking and crawling of the bisque, assembling said members to form the tank structure, welding said members together along contiguous surfaces, and firing the welded tank at temperatures approximating 1600° F. to fuse said composition to the tank interior, said composition flowing into and sealing the welded joints between said members and the elevated temperature stress relieving the welded tank structure.

2. In a method of fabricating a glass-lined tank structure having a generally cylindrical shell and an annularly flanged dish-shaped head, the steps comprising separately applying a wet coating of a glass composition to the interior surface of said shell and to the interior surface of said tank head, drying said coating to substantially remove the water therefrom to form a bisque, applying a coating of a paraffin solution to the bisque on the head and shell surfaces to be joined together to increase the bisque elasticity and permit deforming of the head and shell during assembly to obtain a close fit therebetween, assembling the head within an end of said shell with the annular flange of said head being substantially contiguous with the interior surface of said shell, and the dried coating on the head overlapping the dried coating of the shell for a substantial distance, welding the head to the shell at the outer circumference of the contiguous surfaces of said head and shell, and firing the shell and the head at an elevated temperature approximating 1600° F. to fuse said glass composition to the interior surfaces of said shell and head respectively with the glass composition sealing said overlapping contiguous glass coated surfaces to provide a corrosion-resistant joint between the shell and the head and the firing temperatures relieving any residual stresses in the tank that may have been induced therein by welding the head and shell together.

3. A method of fabricating a glass lined tank structure having a generally cylindrical shell and an annularly flanged head, comprising forming the shell and head from sheet steel, coating the surfaces of the shell and head with a liquid glass composition, drying the coating to substantially remove the water therefrom to form a dried glass bisque, treating the bisque with a material to impart elasticity thereto and prevent cracking and crawling of the bisque by flexing of the head and shell during assembly, assembling the head with an end of the shell with the annular flange of the head being substantially contiguous with a surface of said shell and the dried bisque on the flange of the head overlapping the dried bisque coating of the shell for a substantial distance, welding the head to the shell at the outer circumference of the annular flange of the head, and firing the shell and the head at an elevated temperature in the range of 1600° F. to fuse the glass composition to the surface of the shell and the head with the glass composition sealing said overlapping contiguous surfaces to provide a corrosion resistant bond between the shell and the head and the firing temperature serving to relieve any residual stresses in the tank which may have been induced therein by welding the head and the shell together.

References Cited in the file of this patent

UNITED STATES PATENTS

| | | |
|---|---|---|
| 2,070,368 | Martin | Feb. 9, 1937 |
| 2,229,526 | Schabacker | Jan. 21, 1941 |
| 2,384,324 | Martin | Sept. 4, 1945 |
| 2,595,791 | Hunt | May 6, 1952 |